Sept. 16, 1958　　　　　F. A. ROSS　　　　　2,851,778
IMPLEMENTS FOR GRAPHICALLY SETTING UP
AND SOLVING SPHERICAL PROBLEMS
Filed June 23, 1953　　　　　　　　　　17 Sheets-Sheet 1

INVENTOR
F. A. ROSS
BY
ATTORNEYS

Sept. 16, 1958  F. A. ROSS  2,851,778
IMPLEMENTS FOR GRAPHICALLY SETTING UP
AND SOLVING SPHERICAL PROBLEMS
Filed June 23, 1953  17 Sheets-Sheet 4

INVENTOR
F. A. ROSS
BY
ATTORNEYS

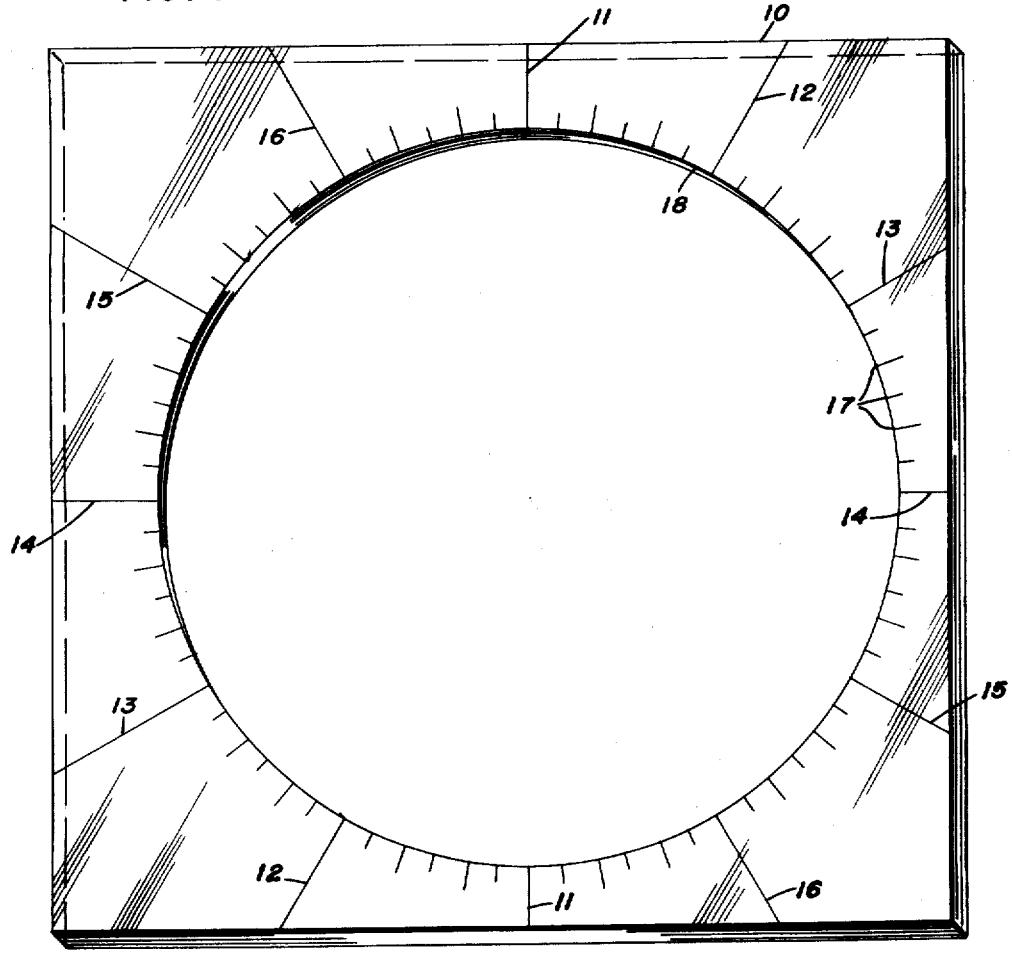

Sept. 16, 1958 F. A. ROSS 2,851,778
IMPLEMENTS FOR GRAPHICALLY SETTING UP
AND SOLVING SPHERICAL PROBLEMS
Filed June 23, 1953 17 Sheets—Sheet 6

INVENTOR
F. A. ROSS

Sept. 16, 1958 F. A. ROSS 2,851,778
IMPLEMENTS FOR GRAPHICALLY SETTING UP
AND SOLVING SPHERICAL PROBLEMS
Filed June 23, 1953 17 Sheets-Sheet 7

INVENTOR
F. A. ROSS
ATTORNEYS

Sept. 16, 1958     F. A. ROSS     2,851,778
IMPLEMENTS FOR GRAPHICALLY SETTING UP
AND SOLVING SPHERICAL PROBLEMS
Filed June 23, 1953     17 Sheets—Sheet 8
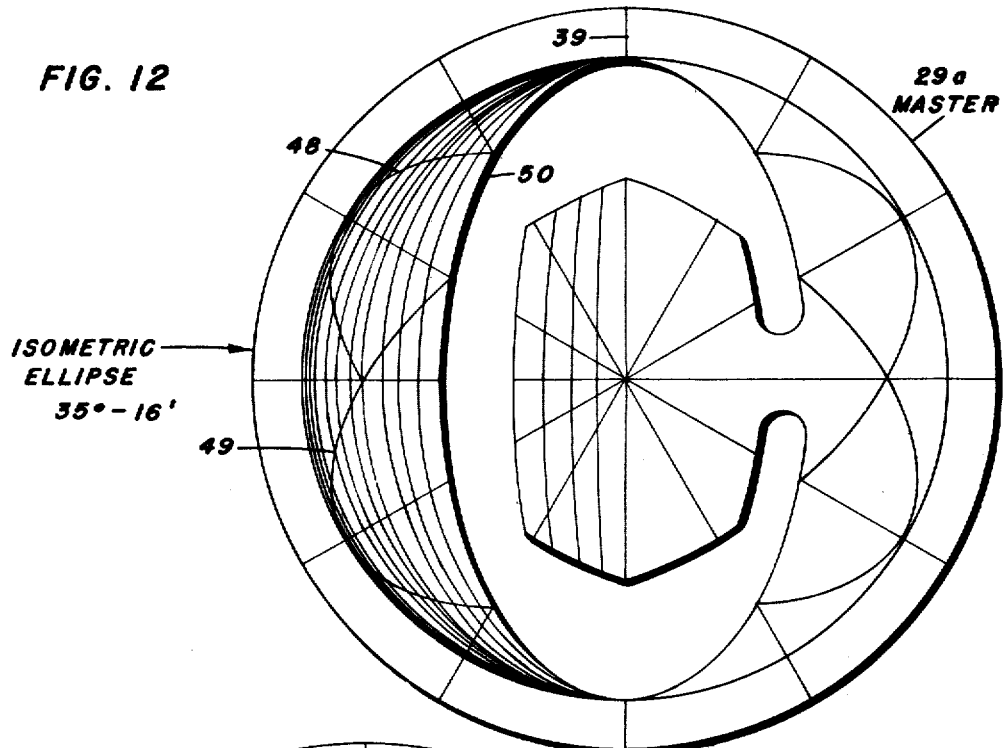
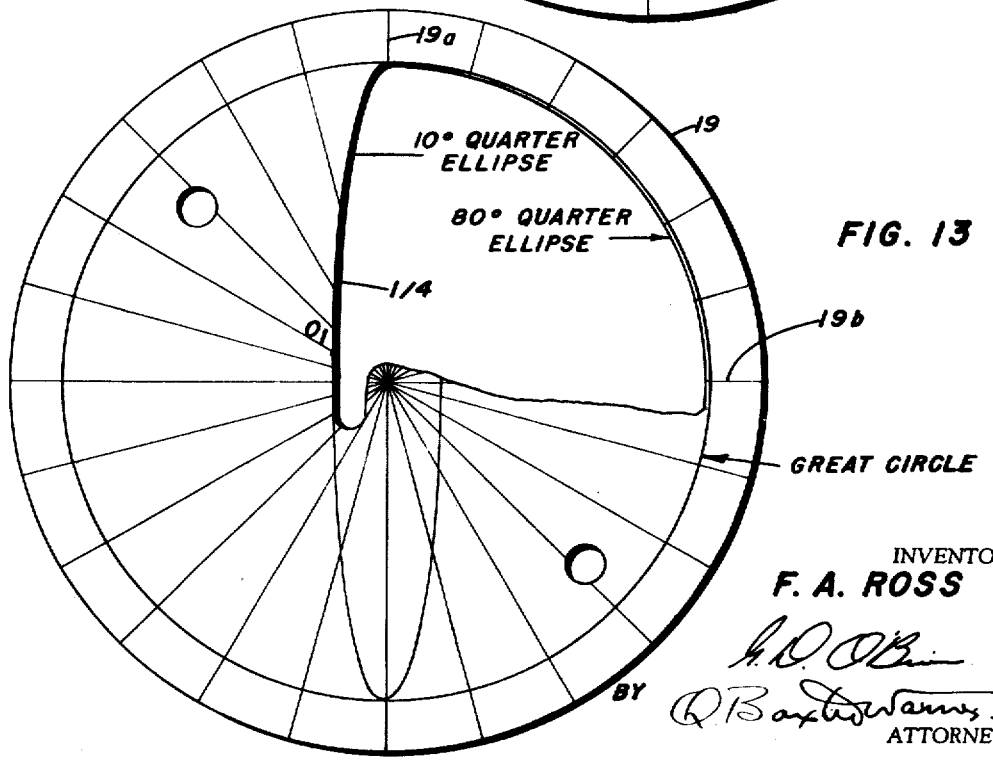
INVENTOR
F. A. ROSS
BY
ATTORNEYS Sept. 16, 1958  F. A. ROSS  2,851,778
IMPLEMENTS FOR GRAPHICALLY SETTING UP
AND SOLVING SPHERICAL PROBLEMS
Filed June 23, 1953  17 Sheets-Sheet 10

INVENTOR
F. A. ROSS

BY

ATTORNEYS

Sept. 16, 1958  F. A. ROSS  2,851,778
IMPLEMENTS FOR GRAPHICALLY SETTING UP
AND SOLVING SPHERICAL PROBLEMS
Filed June 23, 1953  17 Sheets-Sheet 15

INVENTOR
F. A. ROSS
BY
ATTORNEYS

INVENTOR
F. A. ROSS

Sept. 16, 1958      F. A. ROSS      2,851,778
IMPLEMENTS FOR GRAPHICALLY SETTING UP
AND SOLVING SPHERICAL PROBLEMS
Filed June 23, 1953      17 Sheets-Sheet 17

INVENTOR
F. A. ROSS
BY
ATTORNEYS

United States Patent Office 2,851,778
Patented Sept. 16, 1958

2,851,778

IMPLEMENTS FOR GRAPHICALLY SETTING UP AND SOLVING SPHERICAL PROBLEMS

Frederick A. Ross, Pocomoke City, Md.

Application June 23, 1953, Serial No. 363,702

3 Claims. (Cl. 33—1)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in educational equipment for use in demonstrating principles of descriptive geometry and spherical trigonometry and more particularly to implements for graphically setting up and solving spherical problems on flat surfaces.

The general purpose of the invention is to provide time-saving implements mechanically facilitating setting up, drawing diagrams of, and solving spherical problems involving the orientation of the principal axes of great and small circles in varying amounts of foreshortening from the normal plane view of the great and small circles through the families of ellipses to the straight line trace of the great and small circles.

Older methods of setting up these ellipses required the projection of a series of points using the principles of descriptive geometry to trace the projection of these points from their respective positions on the foreshortened curve. Various irregular curves were then used to construct a faired line through the projected points to complete the ellipse. Other methods required complex and expensive ellipse drawing machines.

The old methods were time-consuming, the equipment was expensive, and proper predetermination of the axes of the curves was difficult. Numerous confusing construction lines were required. By none of these prior methods or devices was it possible to construct foreshortened curves rapidly or to measure on these curves conveniently, if at all. Oftentimes, the resulting curves had improper orientation because of the obstruction of one plane by another when a diagram was completed. No reasonable solution of typical spherical problems such as those encountered in the art of fire control could be determined from old methods.

An important object of the invention is to provide equipment enabling the rapid and facile construction of spherical figures with a favorable degree of precision. By the use of the equipment herein disclosed, many problems such as the representation of the various planes involved in the art of three-dimensional fire control which would otherwise require days to complete can be set up in a few hours. Because of the facility with which the device can be used to set up such figures, the invention encourages greater use of accurate spherical figures and consequently a clearer understanding of the principles of descriptive geometry and spherical trigonometry.

Another important object of the invention resides in the provision of equipment permitting predetermination of the presentation and suitability of a spherical figure before the labor of constructing it is performed.

A further object is the provision of equipment that permits easy approximate scaling of a spherical problem both for the purpose of setting up a figure and after the figure is drawn.

The invention also aims to provide equipment whereby errors of determining the proper orientation and extent of intercepts of planes of great and small circle ellipses can be reduced.

Other objects and many of the attendant advantages of this invention will be readily appreciated as the same becomes better understood by reference to the following detailed description when considered in connection with the accompanying drawings wherein:

Figs. 1 and 2 are plan views of typical great circle ellipse templates for 25° and 15° ellipses, respectively;

Fig. 6 is a plan view of the pilot frame of Fig. 5;

Figure 7:
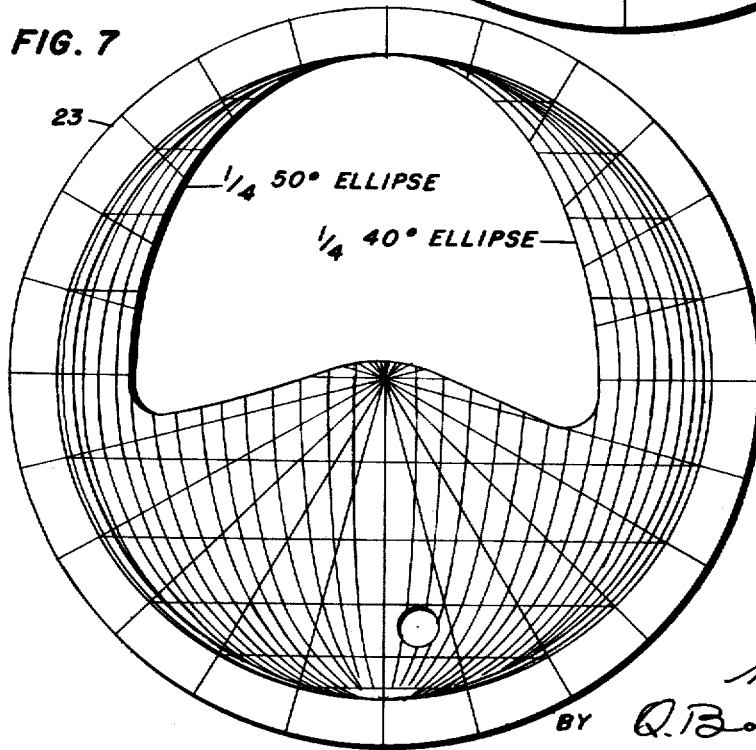
Figure 8:
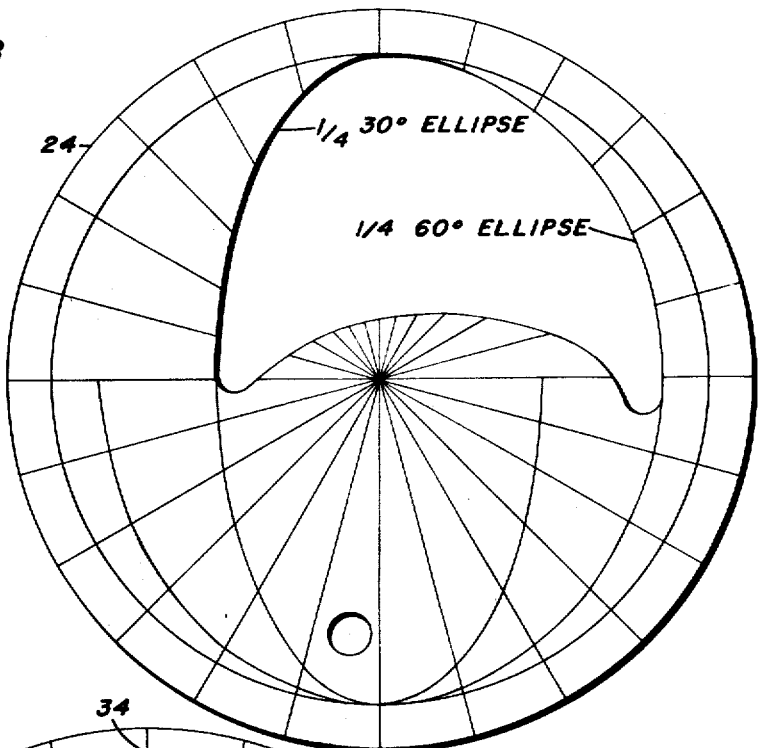
Figure 9:
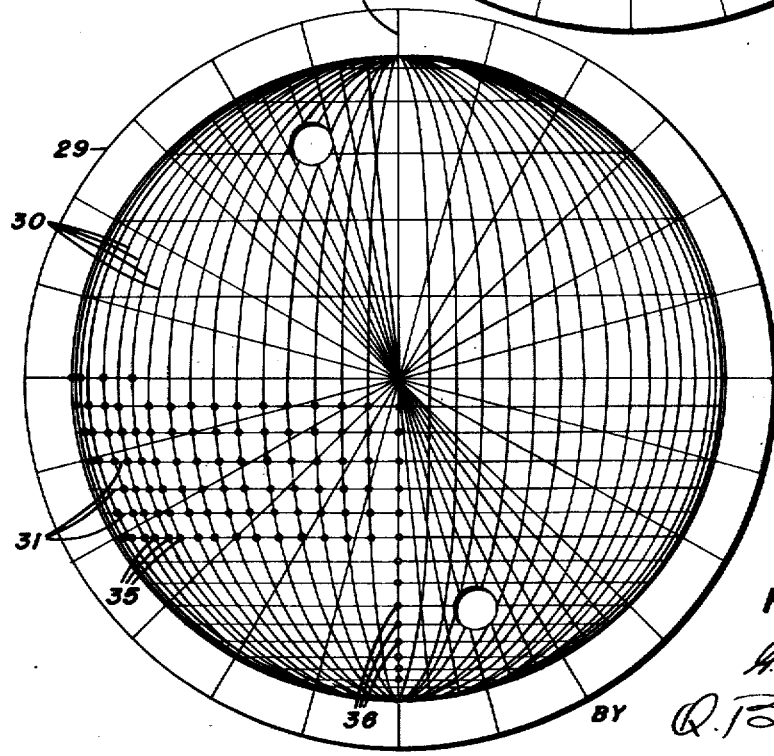
Figure 10:
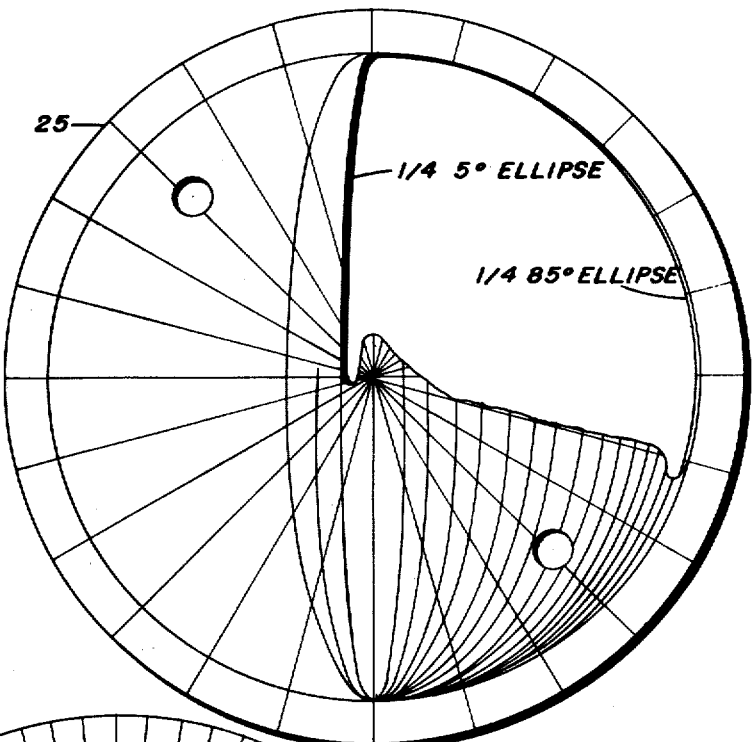
Figure 11:
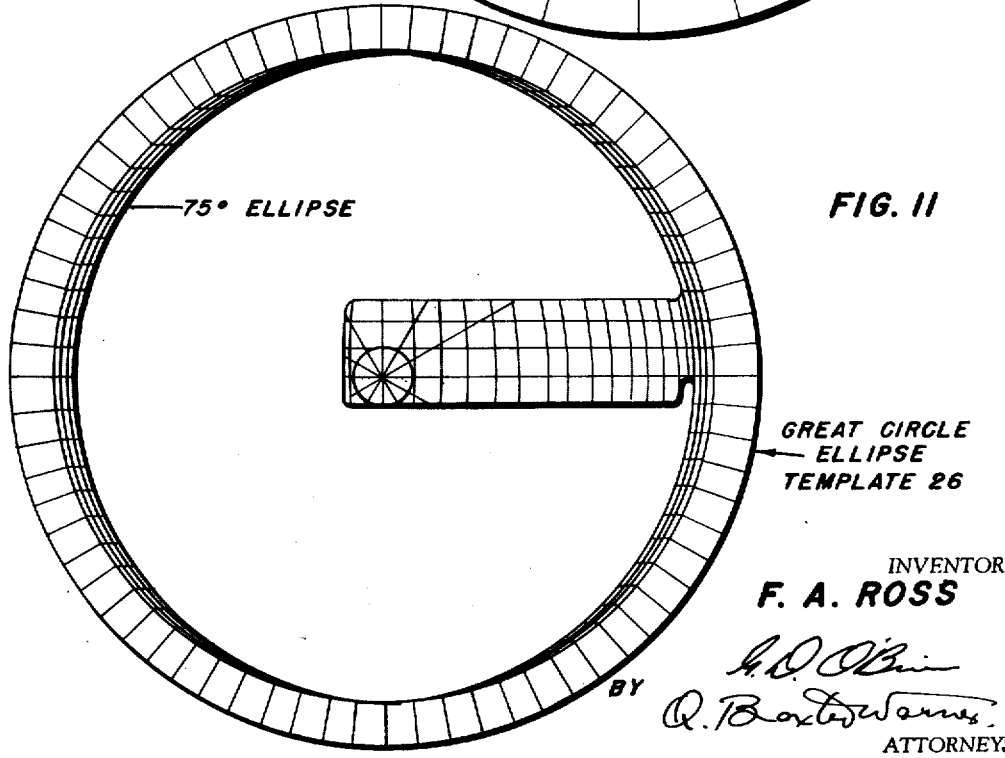

Figs. 7 and 8 are plan views of great circle ellipse templates one defining 40° and 50° quarter ellipses of great circles and the other defining 30° and 60° quarter ellipses of great circles;

Fig. 9 is a plan view of a finely graduated solid transparent rotary insert or master template;

Fig. 10 is a plan view of a great circle ellipse template defining 5° and 85° quarter ellipses of great circles;

Fig. 11 is a plan view of a great circle ellipse template for a 75° ellipse;

Fig. 12 is a plan view of a great circle ellipse template for the isometric ellipse of 35° 16';

Fig. 13 is a plan view of a great circle ellipse template defining 10° and 80° quarter ellipses of great circles; and Figs. 14–22 are views demonstrating some of the uses of the invention.

Figure 5:
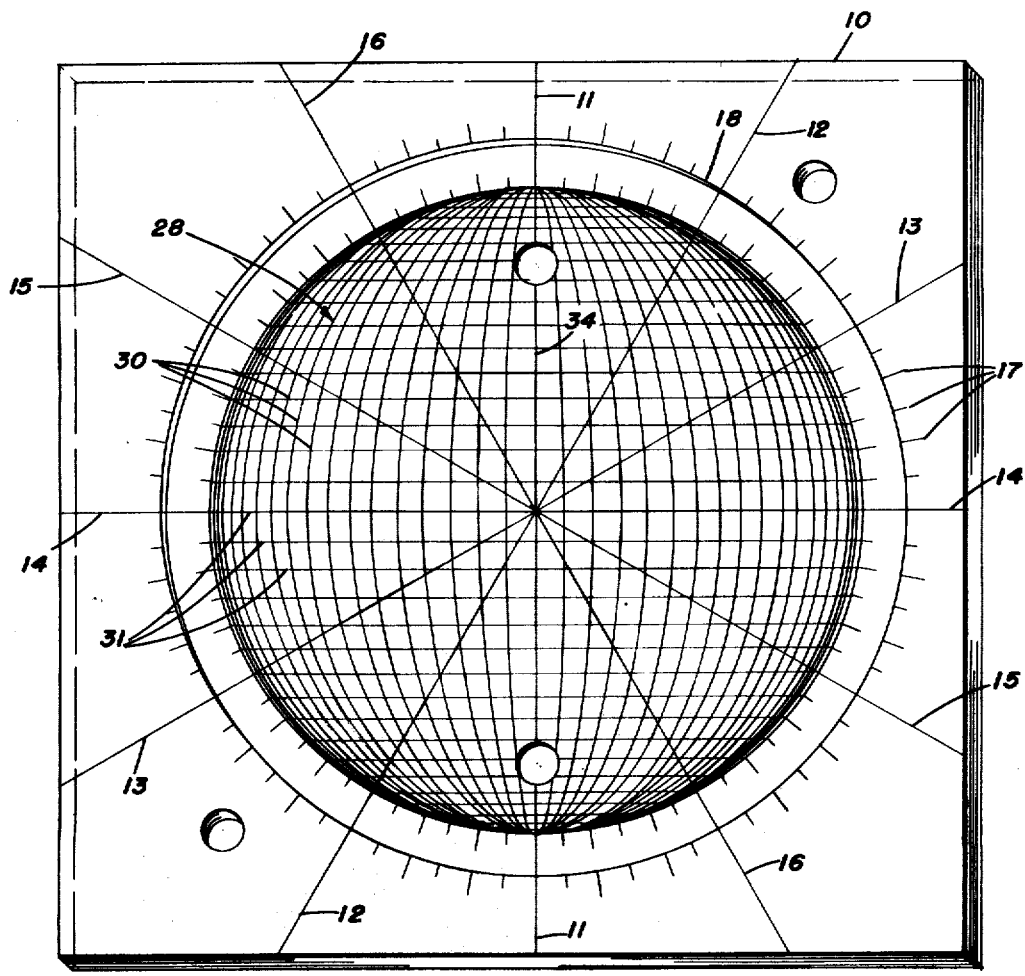
Fig. 5 is a plan view of a pilot frame with a coarsely graduated solid transparent rotary insert or master template removably associated therewith.

In the drawings, which for the purpose of illustration show various implements for practicing the invention, like reference characters denote like parts throughout the several views. In Figs. 5 and 6 is shown a pilot frame 10 of transparent sheet plastic having suitably delineated therein, as by scribing, the principal axes 11—16 and any other auxiliary axes or degrees graduations 17 to facilitate the work for which the device is to be used.

In this frame 10 is a circular opening 18 which, being provided with a thickness greater than that of any individual template, receives and centers for rotation any one or a combination, in superposed relation, of two of a series of great circle and small circle ellipse templates 19—26 and 27, respectively, designed for the representation of a specific spherical problem or part of a spherical problem. These templates 19—27 are cut from transparent sheet material to fit and rotate within the circular opening 18 in the frame. Within these templates the predetermined curves of the families of ellipses of the great and small circles of a sphere are produced as edge walls defining openings therein to guide in setting up the figure of any given spherical problem.

The ellipse curves of templates 19—26 represent the conventional longitudinal divisions of a sphere and the small circles of template 27 correspond to the latitude divisions on the sphere which can be conceived as assuming any kind of rotary attitude in space.

The template 19 of Fig. 13, in addition to defining the

10° and 80° quarter ellipses of the great circle shown, is subdivided into 15° segments by lines two of which, 19a and 19b, lie on the major axes of the ellipses and are normal to each other.

Figure 1:
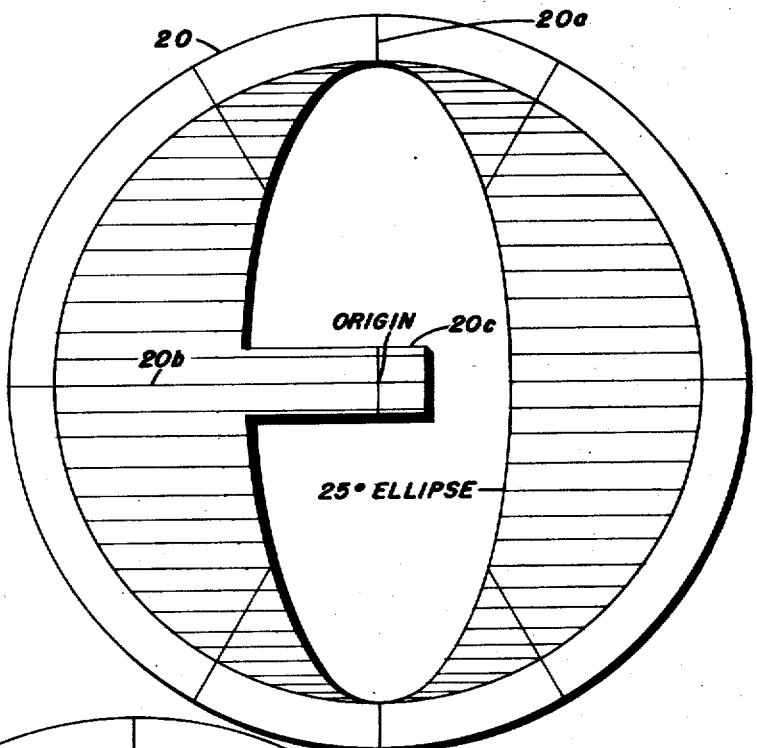
Fig. 1A is a plan view of a modified template for a 25° ellipse.

The template 20 of Fig. 1, in addition to defining the 25° ellipse of the great circle, is subdivided into appropriate construction latitude lines and diameter lines two of which, 20a and 20b, lie on the respective major and minor axes of the ellipse and intersect on a projection 20c at the origin of the ellipse. The template 21 of Fig. 2 embodies principles of construction similar to that of Fig. 1.

Figure 3:
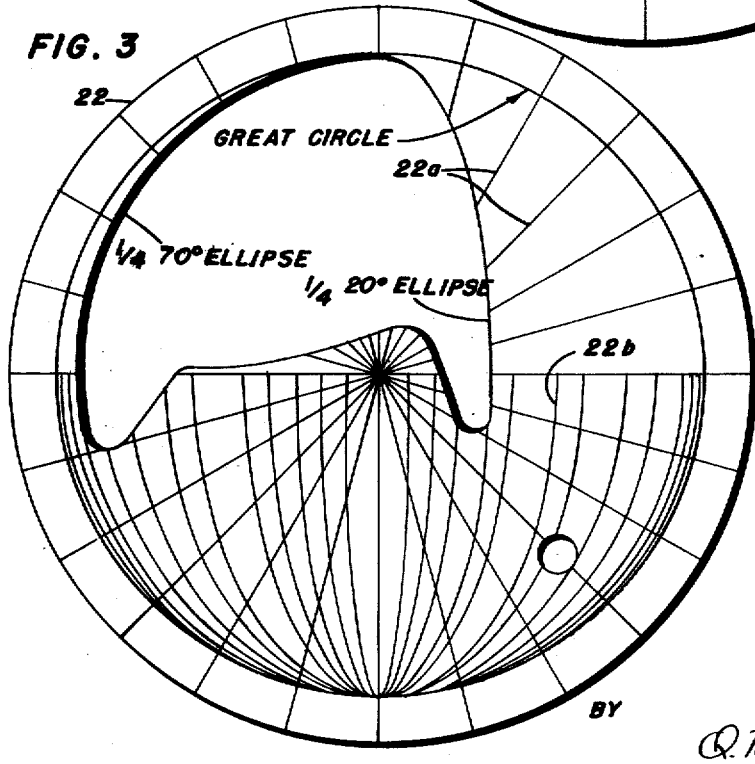
Fig. 3 is a plan view of a modified form of great circle ellipse template defining quarter ellipses of 20° and 70° on a single template for economy of material.

The template 22 of Fig. 3 for economy of material, carries 20° and 70° quarter ellipses of the great circle and is also inscribed with rectilinear segmental and elliptical longitudinal lines 22a and 22b.

The remaining construction guide templates have design features similar to those just described. Suitable holes may be provided in the templates to facilitate their manipulation such as those illustrated in Figs. 3, 4, 5, 7, 8, 9, 10 and 13. Fig. 11 shows radial degree index lines joining parallels of latitude, both of which are in the same plane. To clearly indicate the origin of the 75° ellipse shown in Fig. 11, a small circle having the origin as its center has been scribed.

In addition to the construction guide templates 19—27 of the great and small circle ellipses, one or more solid transparent scaling inserts 28, 29 or a partially open transparent master insert 29a may be fitted into the frame 10 and superposed to make a preliminary study of a given spherical problem and to serve as a guide in orienting the axes of the construction templates 19—27. These solid or partially open inserts 28, 29, 29a contain the traces 30 of the ellipses as longitudinal delineations, and the traces 31 of the small circles representing the latitude divisions. The scale inserts may be made with or without holes, such as holes 35, 36 in template 29 of Fig. 9, at the intersections of the latitude and longitude lines according to the needs of the user.

The flexibility of the equipment is limited only by the variety and selection of available templates deemed desirable or necessary to have at hand in order to perform the work. Inasmuch as the equipment is comparatively cheap in construction, it can be made to any desired degree of completeness from three essential basic pieces, namely, the pilot frame 10, the insert scale 29, and the construction template 29a of the isometric ellipse of 35° 16'. With this selection, other ellipses can be roughed in free hand and finished with a French curve if the problem is simple. From these three basic pieces, the device can be augmented as desired depending on the needs. For instance, the equipment can consist of the pilot frame 10, coarse and finely graduated master scaling inserts 28 and 29, and the combined ellipse construction guide and master sealing insert 29a of Figs. 6, 5, 9 and 12 respectively, or it can be extended to include templates defining all the families of ellipses of the great and small circles by 10°, 5°, or even smaller degree steps if necessary. However, the parts illustrated in the drawings are considered most practical. Inasmuch as any given figure may be scaled up or down photographically as desired, only one set of implements is needed for a large range of sizes. In the construction of these implements has been performed once and for all the tedious plotting of points and curve tracing since a permanent curve has been produced for each ellipse desired and the mechanism allows the necessary rotation of the ellipse to the required position. For any given angular view of a circular trace in a plane there will appear only one ellipse. This ellipse may be oriented in any fashion desired simply by rotating its axes about the origin.

The technique of its use is not difficult to acquire since the principles involved are those of conventional descriptive geometry and spherical trigonometry. The pilot frame 10, constructor templates 19—27 and scaling inserts 28, 29 and 29a should always be placed with their marked faces against the working surface to provide sharp, shadow free vision through the templates.

Figure 14:
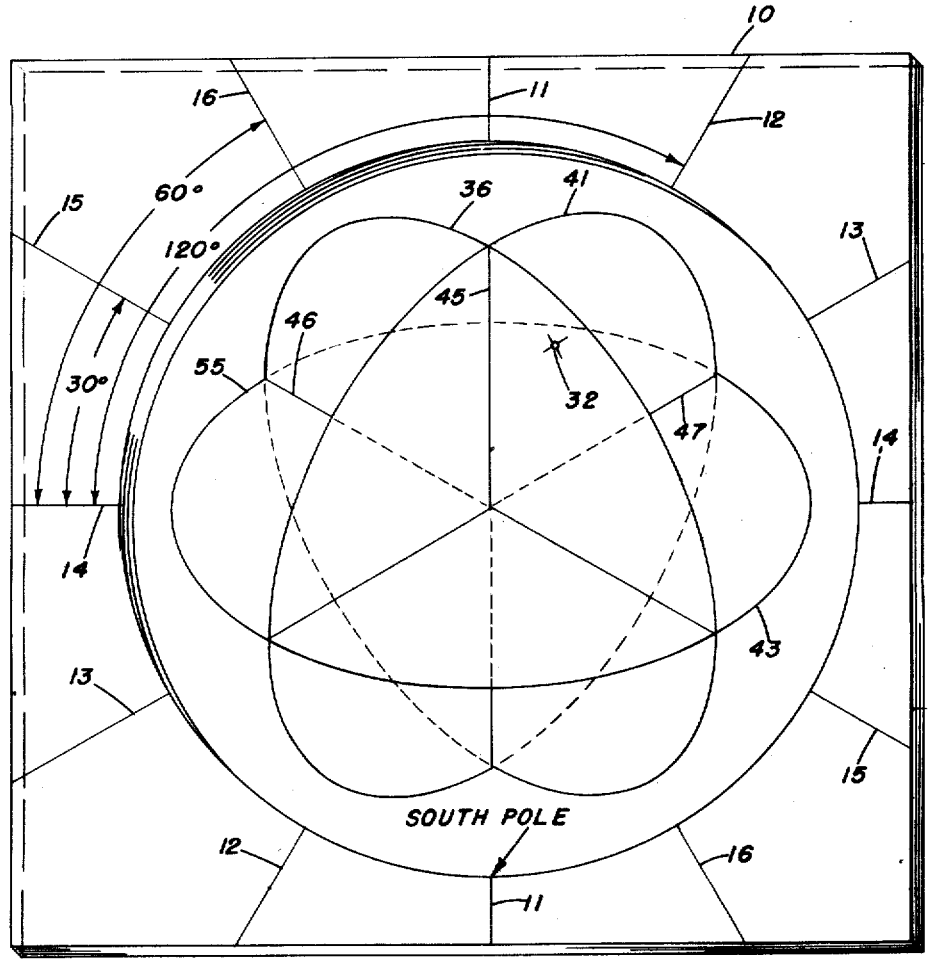

To set up a diagram the pilot frame 10 is first placed in position on a drawing surface and squared with the surface boundary to properly position the vertical axis 11, as shown in Fig. 14. The orthogonal planes and axes of reference are set up by placing the master insert 29a, Fig. 12, in the pilot frame aligning the major axis 39 of the isometric 35° 16' construction curve with the 60° axis 16 of the pilot frame 10 and constructing the curve axis 36. This ellipse is made as a solid or visible trace from the 30° axis 15 clockwise to the south pole of the vertical or polar axis 11. The hidden remainder of the curve 36 is conventionally shown as a dashed curved line. The major axis 39 of the master insert 29a is next rotated within the frame opening to align with the 120° axis 12 and the curve 41 produced in the same manner as curve 36. The hidden part of the curve 41 from the 30° axis 13 clockwise to the south pole of axis 11 is shown as a dashed curved line while the visible remainder of the curve 41 is drawn solid. Next the major axis 39 is again rotated clockwise to align with the horizontal axis 14 and the curve 43 is produced. From the axis 13 clockwise 240° to the axis 15 the curve 43 is visible and is shown as an unbroken curved line while the hidden remainder of the ellipse is shown as a dashed line. The three orthogonal planes are now represented as isometric ellipses 36, 41 and 43. The next step is to draw in the vertical axis 45 and the 30° isometric axes 46 and 47 as indicated in Fig. 14 to show the intercepts of the planes bounded by the ellipses 36, 41 and 43. These intercepts 45—47 also form the orthogonal axes of the isometric frame of reference. This figure forms the basic diagram in which spherical problems may be set up by means of the constructor templates of the great and small circle ellipses.

From an inspection of Fig. 12 it will be observed that traces 48 and 49 of the isometric ellipses appear on the master insert 29a. These traces serve as visual aids in orienting the constructor ellipse 50 of Fig. 12.

Figure 2:
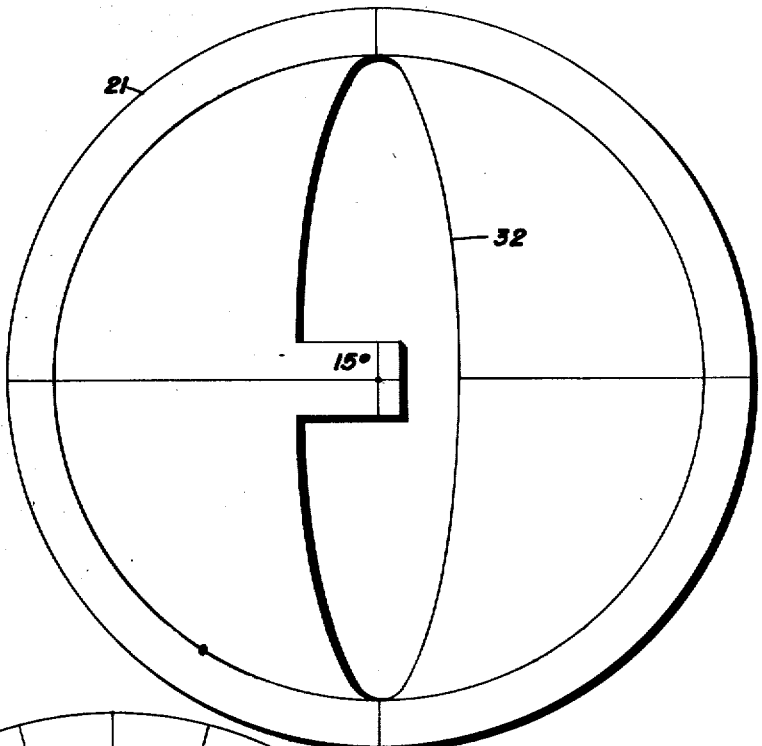
Figure 15:
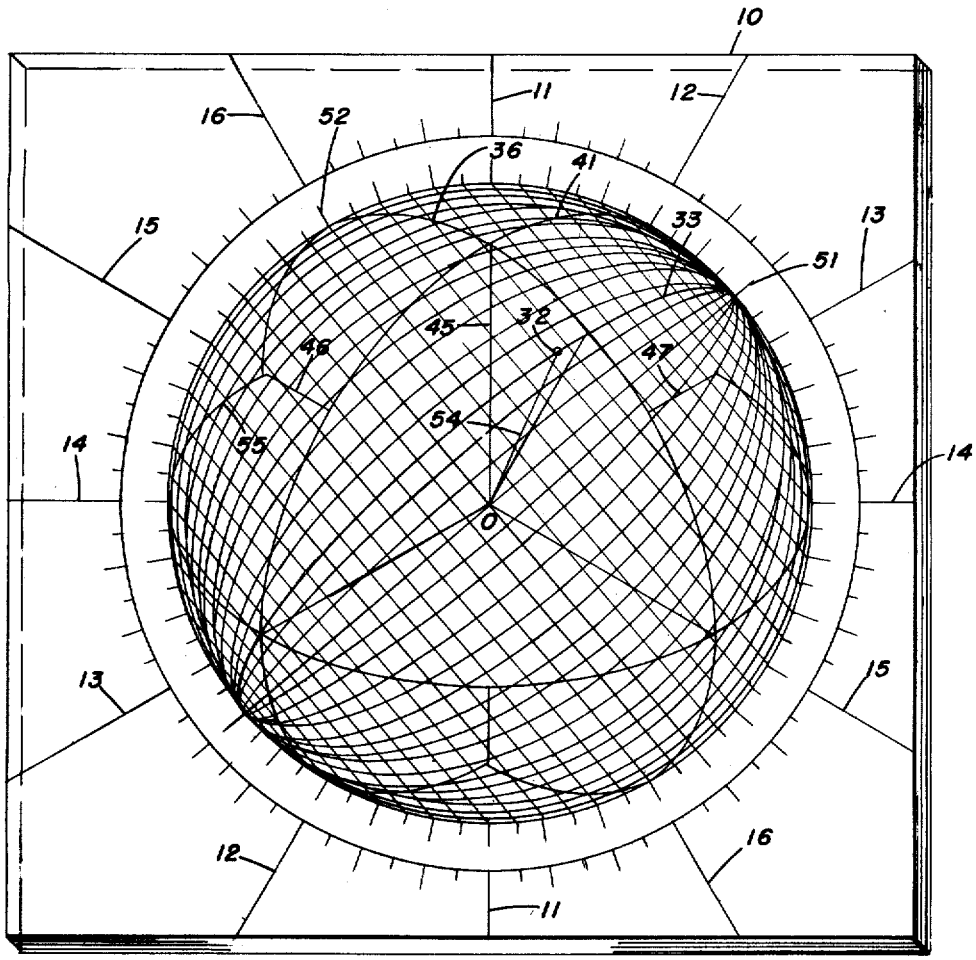
Figure 16:
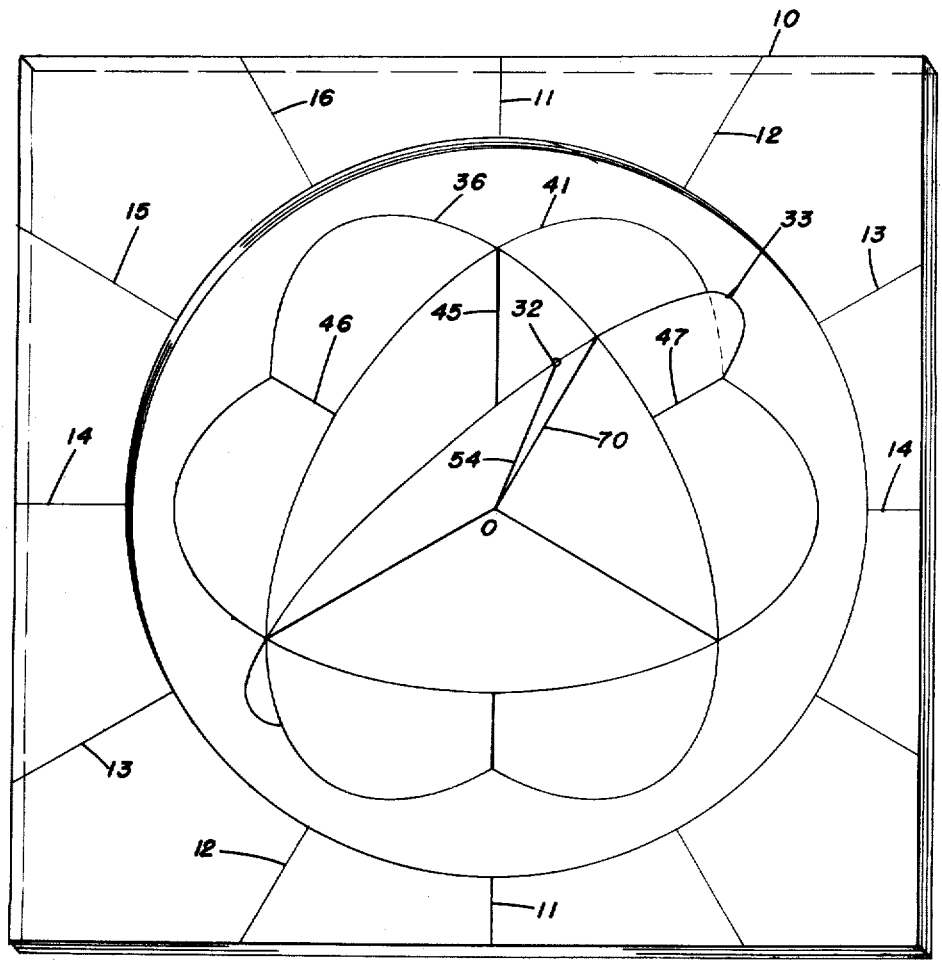

The next steps in a typical problem may be (1) to construct a diagram to include a given point 32 located in the basic frame of reference, Fig. 14; (2) to measure the arc or central angles defined by the point 32 and (3) to perform a transformation from one system to another. Fig. 15 demonstrates the procedure for step (1) wherein either one of the solid inserts 28 or 29 is placed in the pilot frame 10 and centered at the origin point 0. The selected insert is then rotated until one 33 of the ellipse traces such as the third or 15° ellipse above point 0 aligns with the point 32 and contacts the poles of the isometric axis 47. The solid scale insert 28 or 29 is removed and the 15° construction template 21 of Fig. 2 is placed in the pilot frame 10 and rotated until its curve aligns with the point 32 and the poles of the isometric axis 47. The trace 33' of this curve is then reproduced on the surface below. The line 54 and intercept line 70 are drawn to produce the diagram of Fig. 16. Repeating the above procedure for the curve passing through the point 32 and the poles of the isometric axis 45, a curve 86 such as that of the 20° ellipse is determined by the solid insert 28 or 29 as in Fig. 17, and reproduced as line 86' by use of the 20° construction template 22 of Fig. 3, thus producing the diagram of Fig. 18.

Figure 19:
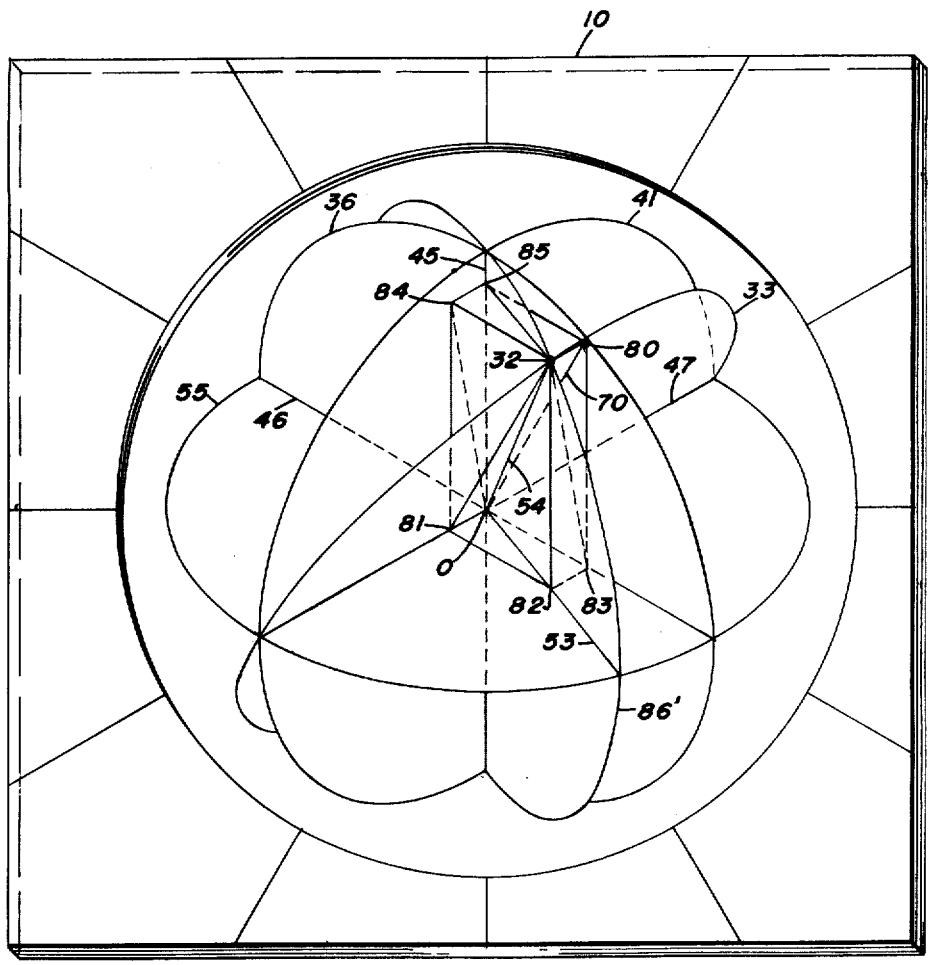

The proper oblique projections of point 32 and intercept line 54 are shown in Fig. 19 where points 80—85 form the respective projections of the point 32 and the component sides and diagonals of a parallelopipe in isometric perspective, the figure being drawn with its edges parallel to the isometric axes 45—47 and the diagonals then constructed as shown.

Again referring to Fig. 15, the problem includes measuring the central angle defined by the given point 32 on the 15° ellipse. Either one of the solid inserts 28 or 29 serves as a scale for measuring any one of the arcs or angles of the sphere containing the related longitudinal trace simply by placing the insert in the frame and rotating it until the ellipse containing the selected point 32 along which a measurement is desired aligns with the 15° arc 33 on the solid insert. The latitude lines on the solid inserts 28 and 29 form graduations along the ellipses of the great circles. Along the particular 15° ellipse curve of the great circle, the graduations on the insert between point 32 and axis 47 are then the measure of either the arc or the central angle of the sphere, in this case approximately 82°, determined by the 5° latitude graduations. If the ellipse falls between two graduations on the insert scale, a reasonable approximation by interpolation is possible. Similarly the traces 31 of the small circles on the insert 29 can be used for measuring arcs or angles along the polar axis 34 of the sphere.

Figure 17:
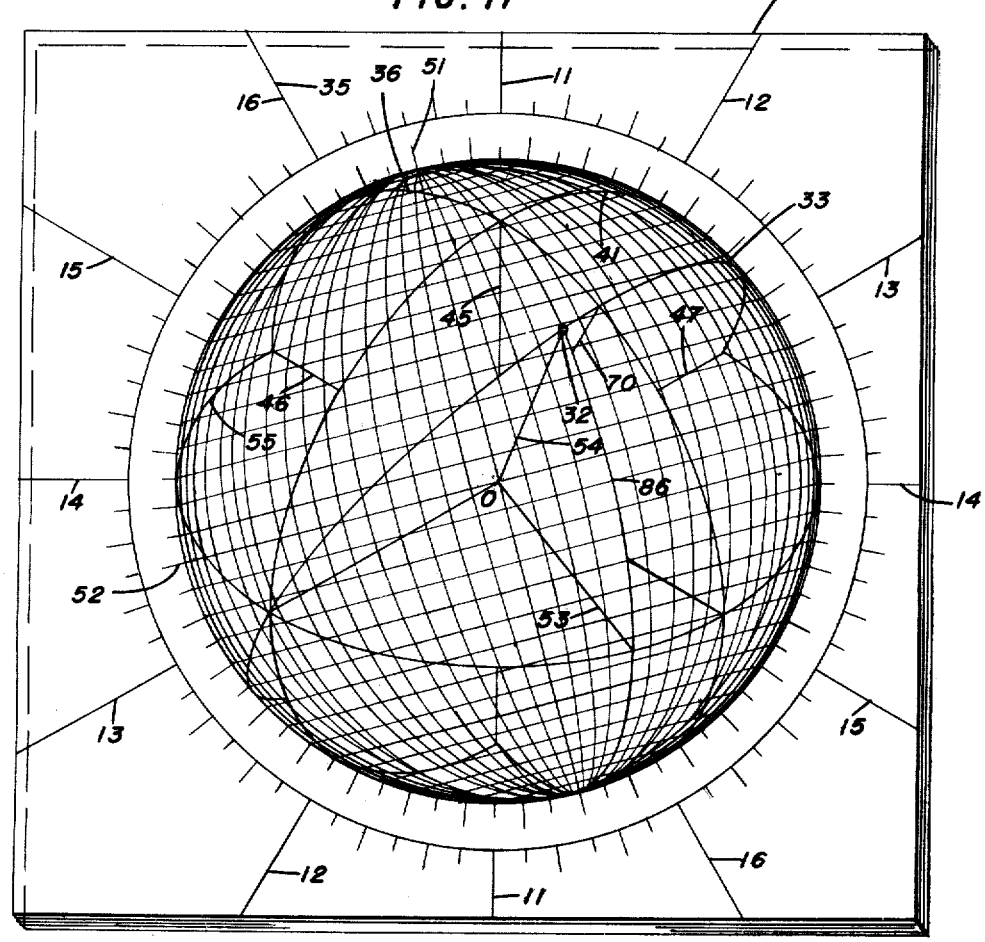
Figure 18:
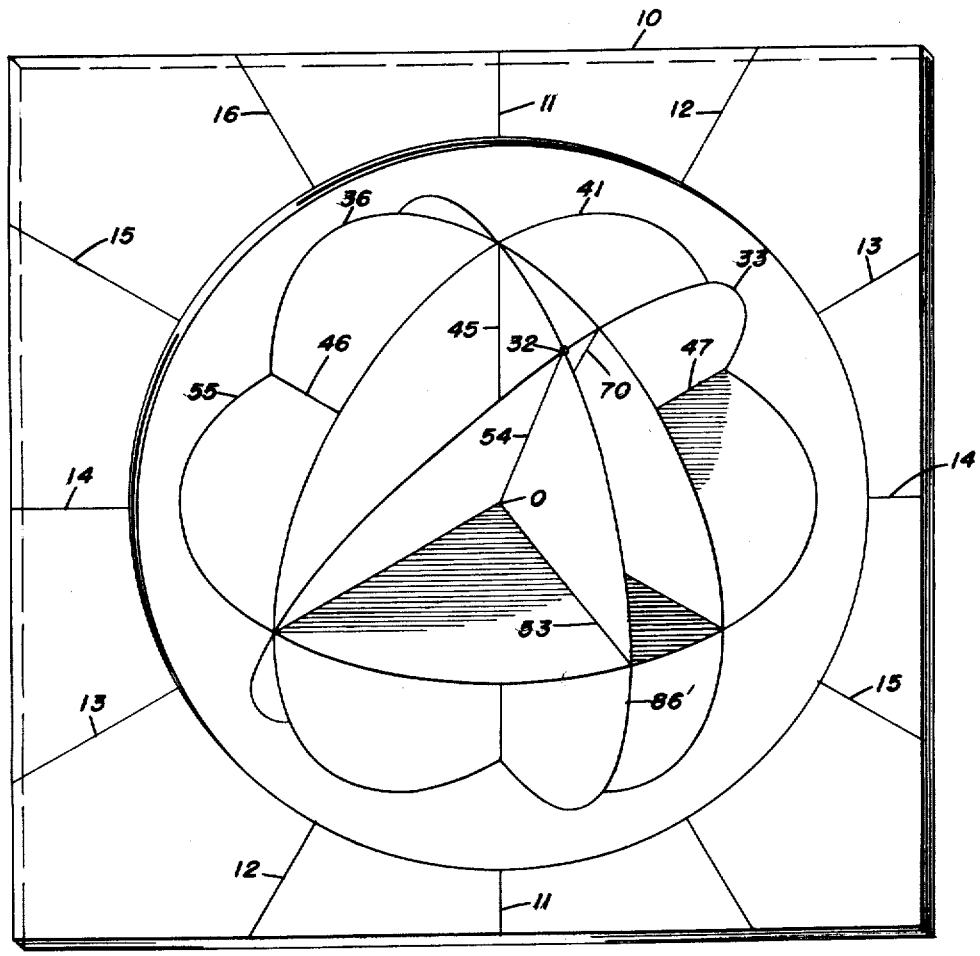

The angle 82° on the 15° ellipse 33 of Fig. 15 just measured can be transformed into any other plane and measured as shown in Fig. 17 on the 20° ellipse 86. Here it is found that the central angle formed between intercepts, lines 53 and 54, is approximately 62°, determined by counting the latitude graduations with the 20° trace of the solid insert 28 or 29 coinciding with the ellipse 86 as shown in Fig. 17.

Figure 4:
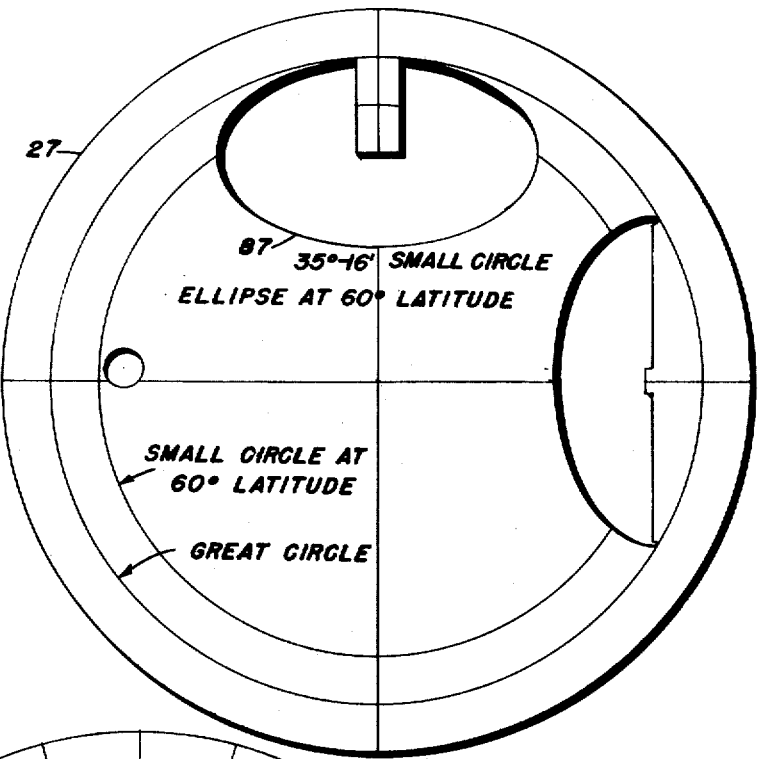
Fig. 4 is a plan view of a small circle ellipse template defining an isometric small circle ellipse at 60° latitude and another half ellipse of a small circle.

Referring to Fig. 4, the small circle ellipses when symmetrically positioned with respect to the polar axis 34 on the solid insert, with the major axis of the small circle ellipses coinciding with the latitude traces 31 of the small circles of the sphere, permit either construction or measurement of central angles and arcs of the small circle ellipses in a manner similar to that just described for the great circle ellipses.

Figure 20:
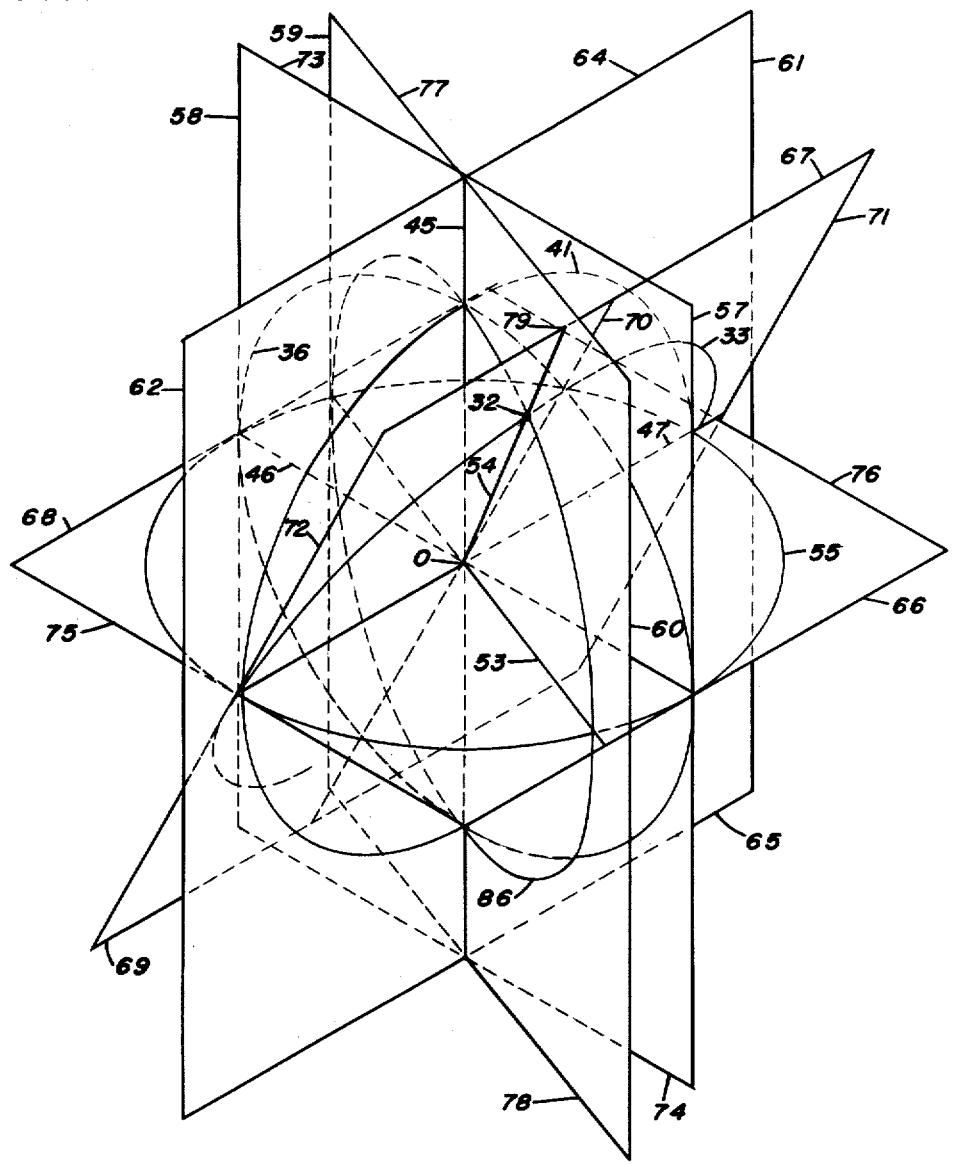
Figure 21:
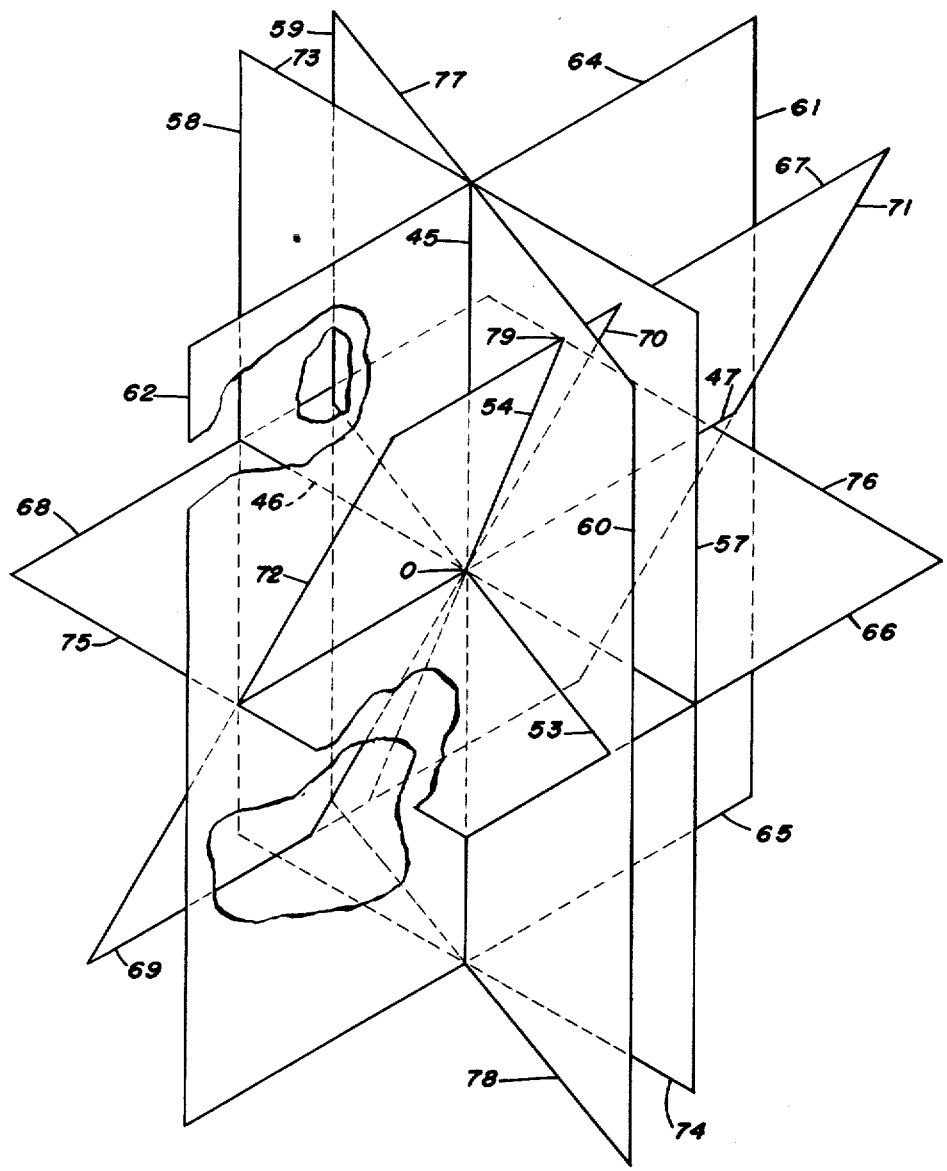

Use of the equipment can be extended to construct properly oriented rectangular planes of reference, as indicated in Figs. 20 and 21, if these planes will better serve the purposes of the problem.

In Fig. 20 the isometric reference ellipses 36, 41 and 55, the 15° and 20° ellipses 33 and 86 through point 32, and the poles of axes 45 and 47 are produced. Intercepts 53, 54 and 70 are introduced and extended as desired. To produce the boundaries of the selected planes, lines 57—62 are made parallel to the vertical axis 45; lines 64—69 are drawn parallel to the isometric axis 47; lines 71 and 72 are constructed parallel to the intercept 70; lines 73—76 are made parallel to the isometric axis 46; and lines 77 and 78 are drawn parallel to the intercept 53. The piercing points such as 79 of the planes are established by the intersection of the plane intercepts such as 54 and the boundaries such as 67. The construction ellipses shown in Fig. 20 are removed after the rectangular plane figures are completed to leave the desired arrangement shown in Fig. 21, where sections are broken through various planes to show various arrangements of the plane intercepts and the plane piercing points. This process can be extended to show any desired number of planes. Rectangular components can be projected into the orthogonal or other frames of reference in the same manner as described for Fig. 19.

Figure 22:
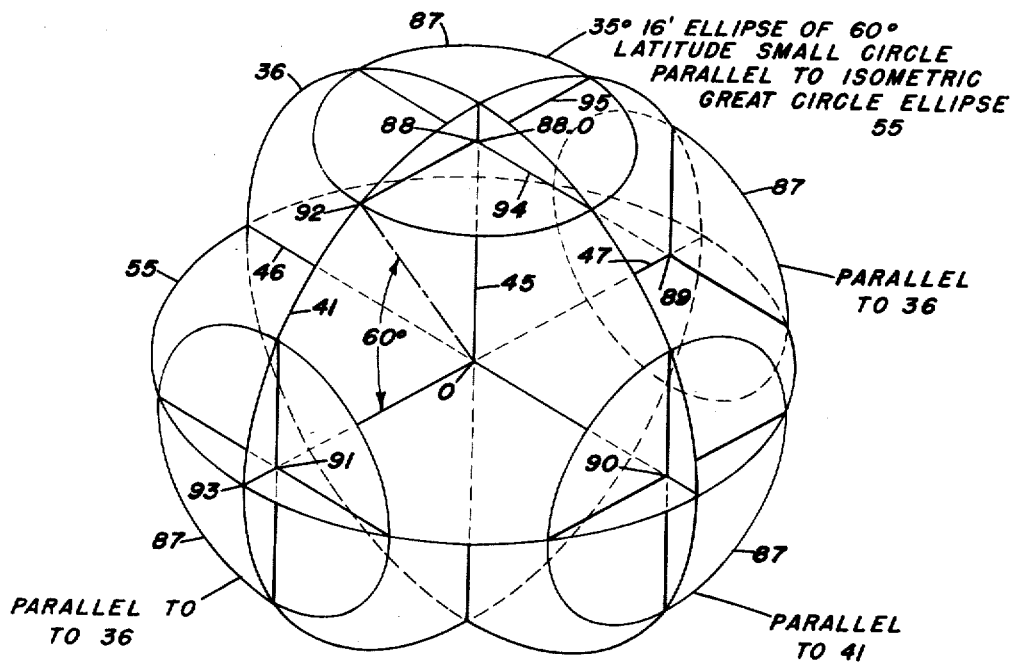

Referring now to Fig. 22, the families of ellipses for the small circles can be utilized to construct planes parallel to any of the great circle ellipses. This is accomplished by constructing the standard isometric frame of reference as in Fig. 14 and then adding any other necessary planes as described for Figs. 15–18. A number of arrangements are possible using the small circle isometric ellipse 87 of the constructor template 27 shown in Fig. 4 for the small circle at 60° latitude on the solid insert 28 or 29. The center of this ellipse 87 is disposed at a point 88 on the axis 45 determined by projecting parallel to the isometric axis 47 from the 60° graduation point 92 away from pole 93 as previously described for measuring central angles or arcs along the great circle ellipses. The small circle ellipse 87 is properly oriented when it intercepts 94 and 95 with the ellipses 41 and 36 are parallel to the principal isometric axes 46 and 47 respectively, or the major axes of the two ellipses 55 and 87 are parallel and the minor axes are coincident with the axis passing through the origins 0 and 88.0. The positions of this ellipse 87 are shown in Fig. 22 with origins 89, 90 and 91. They can be oriented in a similar manner with reference to any other great circle ellipse.

The possible uses of these small circle ellipse templates are still under development and not determined completely. Preferably these templates are constructed with the small circle ellipses initially positioned properly off-center as shown in Fig. 4 whereby a simple rotation within the pilot frame 10 will bring the ellipse into proper position relative to the origin, such as point 88 of Fig. 22.

Graduations of frame, scale inserts and construction templates may be in any convenient units of angle or arc. Likewise the latitude and longitude lines on the template inserts of great and small circles may be in any unit of measure convenient or required for the application of the equipment.

Figure 1A:
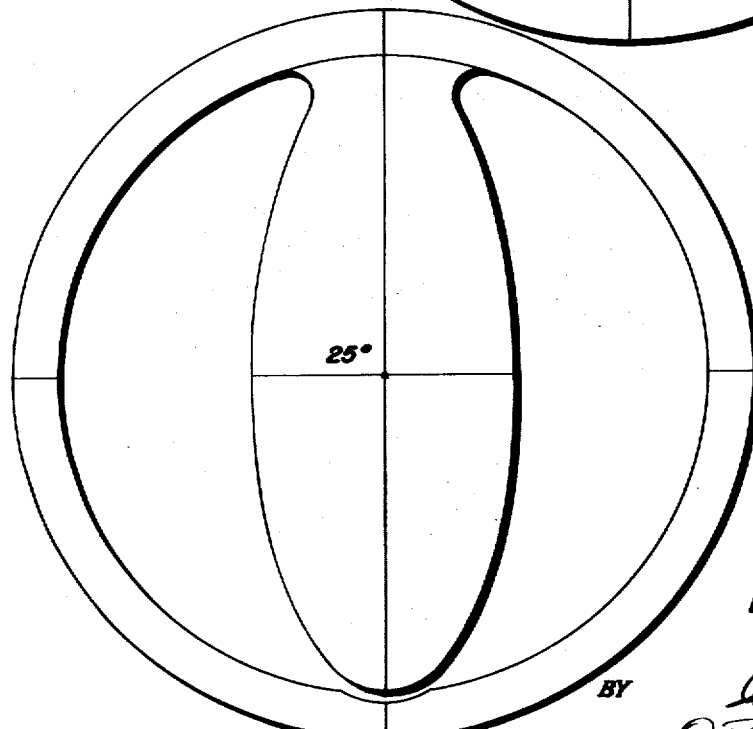

The construction templates may be made so the curve is reproduced around the outside profile of the elliptical figure as indicated in Fig. 1A.

Obviously many modifications and variations of the present invention are possible in the light of the above teachings. It is therefore to be understood that within the scope of the appended claims the invention may be practiced otherwise than as specifically described.

What is claimed is:

1. In equipment for setting up, diagramming and solving spherical problems involving the orientation of principal axes of great circles of a sphere in varying amounts of foreshortening from the normal plane outline of the great circles through the families of ellipses of the great circles to the straight line traces of the great circles, a frame having a centrally disposed circular opening therein, a circular construction guide template rotatably mounted in said opening having an aperture therein, a centrally disposed elliptical wall on said guide template and defining a predetermined ellipse of a great circle of said sphere, the origin of said ellipse coinciding with the center of said template, means for rotating the template within said opening of the frame about its center, and means on said guide template cooperating with complementary means on said frame to facilitate the plotting of the families of ellipses as the guide template is rotated with respect to said frame.

2. In equipment for setting up, diagramming and solving spherical problems involving the orientation of principal axes of great circles of a sphere in varying amounts of foreshortening from the normal plane outline of the great circles through the families of ellipses of the great circles to the straight line traces of the great circles, a circular construction guide template having an opening therein, a plurality of curved walls formed within said guide template and defining a predetermined ellipse of a great circle of said sphere, the origin of said ellipse coinciding with the center of said template, a frame having a circular opening therein receiving said circular template for rotation about its center, and means disposed within said frame and superposed on said guide template for indexing said ellipse on the guide template when the guide template is in a desired position.

3. In equipment for setting up, diagramming and solving spherical problems involving the orientation of principal axes of great and small circles in varying amounts of foreshortening from the straight line trace of the great and small circles of a sphere through the families of ellipses of the great and small circles to the normal plane outline of the great and small circles, a transparent circular master template having longitude delineations thereon representing the traces of a family of ellipses of great circles of said sphere and latitude delineations thereon representing the traces of great and small circles of said sphere, a circular construction guide template having a central elliptical opening therein defining a predetermined ellipse of said family, and a frame having a circular opening therein receiving said circular templates separately or in superposed relation for rotation about their centers whereby the guide template ellipse may be indexed by the master template.

References Cited in the file of this patent

UNITED STATES PATENTS

| | | |
|---|---|---|
| D. 165,849 | Jordan | Feb. 5, 1952 |
| 364,508 | Griffiths | June 7, 1887 |
| 482,023 | Page | Sept. 6, 1892 |
| 709,219 | Hochspeier | Sept. 16, 1902 |
| 727,680 | Otis | May 12, 1903 |
| 1,132,272 | Jacobs | Mar. 16, 1915 |
| 1,262,971 | Olson | Apr. 16, 1918 |
| 1,723,517 | McFadden | Aug. 6, 1929 |
| 1,794,648 | Shattow | Mar. 3, 1931 |
| 2,026,537 | Jensen | Jan. 7, 1936 |
| 2,190,071 | Keppers | Feb. 13, 1940 |
| 2,337,545 | Collins | Dec. 28, 1943 |

FOREIGN PATENTS

| | | |
|---|---|---|
| 1,636 | Great Britain | 1856 |
| 22,630 | Great Britain | 1906 |
| 574,855 | Great Britain | Jan. 23, 1946 |

OTHER REFERENCES

Plate XI and pages 95 to 97 of "Treatise on Isometrical Drawing" by T. Sopwith, 1838.

Page 143 of a book entitled, "Air-Vu System of Drawing" by Daniel J. McQuaid, published by The Air-Vu Co., Denver Colorado. October 1945.